US011288040B2

(12) United States Patent (10) Patent No.: US 11,288,040 B2
Kaul et al. (45) Date of Patent: Mar. 29, 2022

(54) FLOATING-POINT DOT-PRODUCT HARDWARE WITH WIDE MULTIPLY-ADDER TREE FOR MACHINE LEARNING ACCELERATORS

(71) Applicant: Intel Corporation, Santa Clara, CA (US)

(72) Inventors: Himanshu Kaul, Portland, OR (US); Mark Anders, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 16/435,048

(22) Filed: Jun. 7, 2019

(65) Prior Publication Data

US 2019/0294415 A1 Sep. 26, 2019

(51) Int. Cl.
*G06F 7/485* (2006.01)
*G06F 7/487* (2006.01)
(Continued)

(52) U.S. Cl.
CPC ............ *G06F 7/5443* (2013.01); *G06F 5/012* (2013.01); *G06F 7/485* (2013.01); *G06F 7/4876* (2013.01);
(Continued)

(58) Field of Classification Search
CPC .. G06F 7/5443; G06F 7/4876; G06F 7/49936; G06F 7/49952; G06F 7/49942; G06F 7/483; G06F 5/012
See application file for complete search history.

(56) References Cited

U.S. PATENT DOCUMENTS

2013/0060828 A1\* 3/2013 Hilker ..................... G06F 5/012
708/209
2018/0315398 A1 11/2018 Kaul et al.
2020/0371749 A1\* 11/2020 Kennedy ............... G06F 7/5277

FOREIGN PATENT DOCUMENTS

JP 04277836 A \* 10/1992

OTHER PUBLICATIONS

H. Kaul, M. Anders, S. Mathew, S. Kim and R. Krishnamurthy, "Optimized Fused Floating-Point Many-Term Dot-Product Hardware for Machine Learning Accelerators," 2019 IEEE 26th Symposium on Computer Arithmetic (ARITH), 2019, pp. 84-87, doi: 10.1109/ARITH.2019.00021. (Year: 2019).\*

(Continued)

*Primary Examiner* — Emily E Larocque
*Assistant Examiner* — Huy Duong
(74) *Attorney, Agent, or Firm* — Hanley, Flight & Zimmerman, LLC (57) ABSTRACT

Systems, apparatuses and methods may provide for technology that conduct a first alignment between a plurality of floating-point numbers based on a first subset of exponent bits. The technology may also conduct, at least partially in parallel with the first alignment, a second alignment between the plurality of floating-point numbers based on a second subset of exponent bits, where the first subset of exponent bits are LSBs and the second subset of exponent bits are MSBs. In one example, technology adds the aligned plurality of floating-point numbers to one another. With regard to the second alignment, the technology may also identify individual exponents of a plurality of floating-point numbers, identify a maximum exponent across the individual exponents, and conduct a subtraction of the individual exponents from the maximum exponent, where the subtraction is conducted from MSB to LSB.

10 Claims, 6 Drawing Sheets

(51) Int. Cl.
*G06F 5/01* (2006.01)
*G06F 17/15* (2006.01)
*G06F 17/16* (2006.01)
*G06F 7/544* (2006.01)
*G06N 20/00* (2019.01)

(52) U.S. Cl.
CPC .............. *G06N 20/00* (2019.01); *G06F 17/15* (2013.01); *G06F 17/16* (2013.01)

(56) References Cited

OTHER PUBLICATIONS

M. Verhelst et al, Embedded Deep Neural Network Processing: Algorithmic and Processor Techniques Bring Deep Learning to IoT and Edge Devices, IEEE Solid-State Circuits Magazine, Nov. 15, 2017, pp. 55-65, vol. 9, Issue: 4, IEEE.
Indian Examination report for EPO Patent Application No. 202044010145, dated Aug. 19, 2021, 6 pages.

* cited by examiner

FLOATING-POINT DOT-PRODUCT HARDWARE WITH WIDE MULTIPLY-ADDER TREE FOR MACHINE LEARNING ACCELERATORS

TECHNICAL FIELD

Embodiments generally relate to machine learning. More particularly, embodiments relate to floating-point dot-product hardware with a wide multiply-adder tree for machine learning accelerators.

BACKGROUND

Deep neural networks (DNNs) are typically used in machine learning (ML) workloads to perform matrix multiplication and convolution operations, which tend to be the most power and performance limiting operations of the ML workloads. While hardware accelerators with dot-product compute units have been proposed to improve area and energy efficiency of these operations (e.g., using a variety of dataflow architectures and data types), there remains considerable room for improvement. For example, conventional floating-point (FP) dot-product hardware solutions may first find the maximum exponent across floating-point products, with each individual product mantissa (e.g., significand, coefficient) being aligned for accumulation/summation using the maximum exponent and the corresponding individual exponent. Globally searching for the maximum exponent may introduce latency (e.g., decreasing performance). Moreover, the alignment may involve a relatively large amount of hardware (e.g., alignment shifter stages) that adds to latency, cost and/or power consumption. Indeed, as ML applications transition from standard number formats (e.g., floating-point sixteen bit/FP16, with 5-bit exponents) to more optimized number formats (e.g., Brain floating-point sixteen bit/Bfloat16, with 8-bit exponents), the power and performance limitations may increase.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
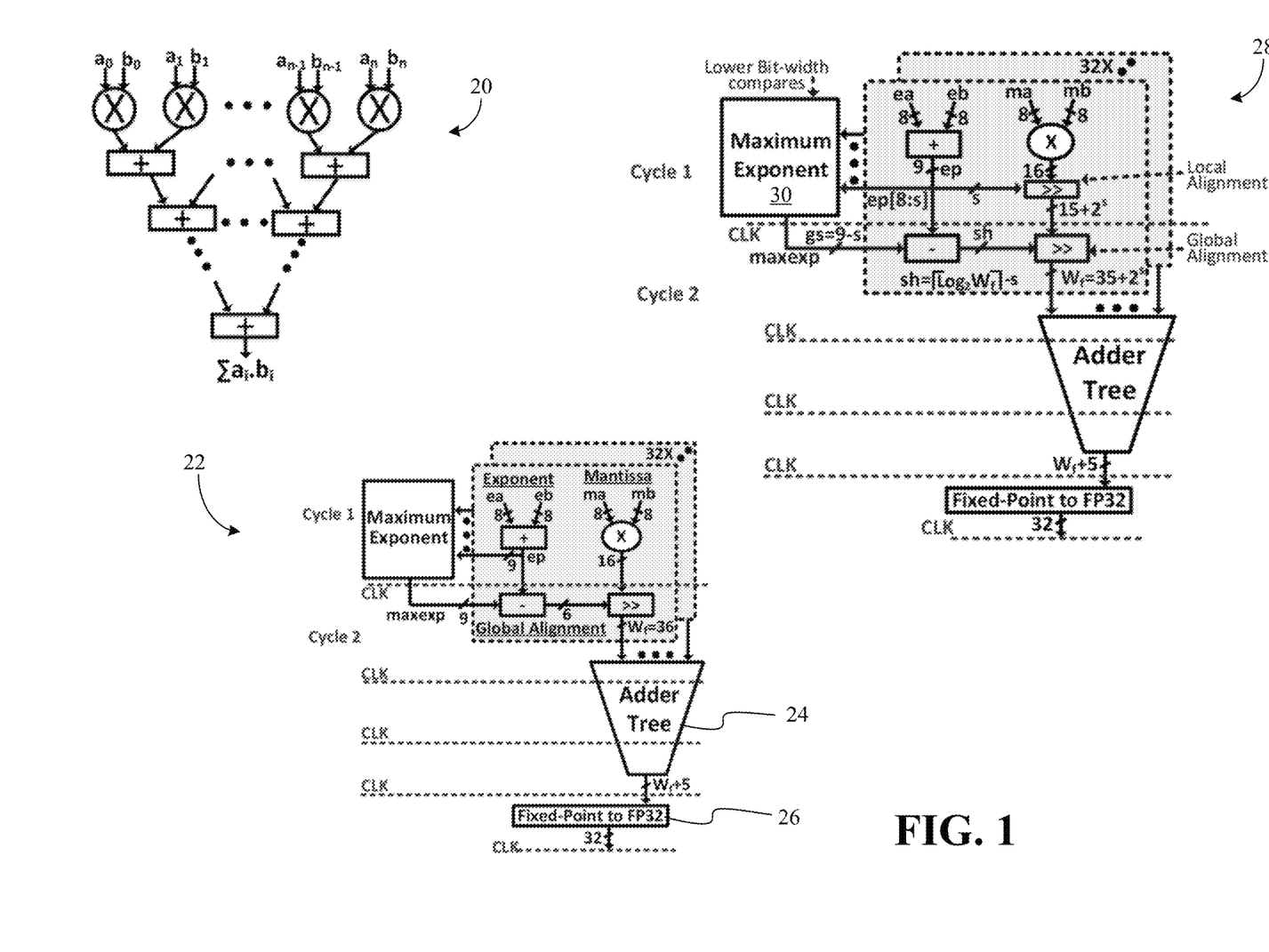
FIG. 1 is a comparative block diagram of an example of multiplier-adder tree hardware topologies according to an embodiment.

Turning now to FIG. 1, a plurality of multiplier-adder trees are shown in which the product between a first array of floating-point numbers (e.g., $a_0, a_1, \ldots a_n$) and a second array of floating-point numbers (e.g., $b_0, b_1, \ldots b_n$) is computed, followed by the summation/accumulation of the computed product. The computations may generally be useful in DNN-based machine learning applications that involve matrix multiplication and convolution operations. In the illustrated example, a first conventional topology 20 is a wide multiply adder tree optimized for input stationary matrix-multiply operations (e.g., matrix-matrix or matrix-vector multiplication operations in which either of the inputs is either stationary or changes less frequently than the other input). Area, energy efficiency, and throughput may generally be relevant to accelerators, with multiplier-adder tree topologies increasing area/energy efficiency as they enable the summation operation to be optimized across multiple inputs. Multiplier-adder tree topologies may also be easily pipelined for higher throughputs. Improving total latency for these designs improves both area and energy, since the latency determines the number and location of required pipeline flip-flops for the same throughput with a multi-cycle design.

Within machine learning, training workloads may involve a relatively high range of floating-point (FP) formats. Straight-forward use of FP multiply and FP add/summation units in the first conventional topology 20 may incur considerable area, energy and latency overhead due to alignment, normalization, and rounding at each FP add unit. A second conventional topology 22 uses a FP-based multiply-adder tree design to amortize the FP add cost. In the illustrated example, the second conventional topology 22 determines the maximum exponent ("maxexp") from all product exponents ("ep") and broadcasts the maxexp to all "global" alignment units for conversion of individual FP multiplies to a fixed-point format.

The fixed-point products are then summed using a fixed-point adder tree 24 and converted back to floating-point format with a single normalization/rounding stage 26 at the end. Thus, the first and second conventional topologies 20, 22 have different accuracies due to the rounding taking place at different locations in the topologies 20, 22. Moreover, output formats are typically wider (e.g., single-precision, $W_f=36$) for higher accumulation accuracy in the second conventional topology 22. The maximum exponent and global alignment stages become the performance limiter for the second conventional topology 22 and this cost is typically exacerbated when switching from conventional FP16 to newer machine learning optimized number formats such as, for example, BFloat16.

An enhanced topology 28 performs a local alignment for partial conversion of each FP product to a fixed-point format based on a few lower significance bits s (e.g., first/local subset of exponent bits) of the exponent. In parallel, the maximum of the remaining higher significance bits (e.g., second/global subset of exponent bits) is computed. A maximum exponent stage 30 now uses fewer bits (e.g., [8:s] rather than all nine ep bits) and fewer alignment shifter stages are used for the remaining global alignment of each FP product. Decoupling alignment based on local and global exponent bits enables some of the alignment operation to be completed in parallel with maximum exponent computation.

Accordingly, the enhanced topology 28 represents an improvement over the first conventional topology 20 and the second conventional topology 22 in terms of latency, cost and/or power consumption.

Figure 2:
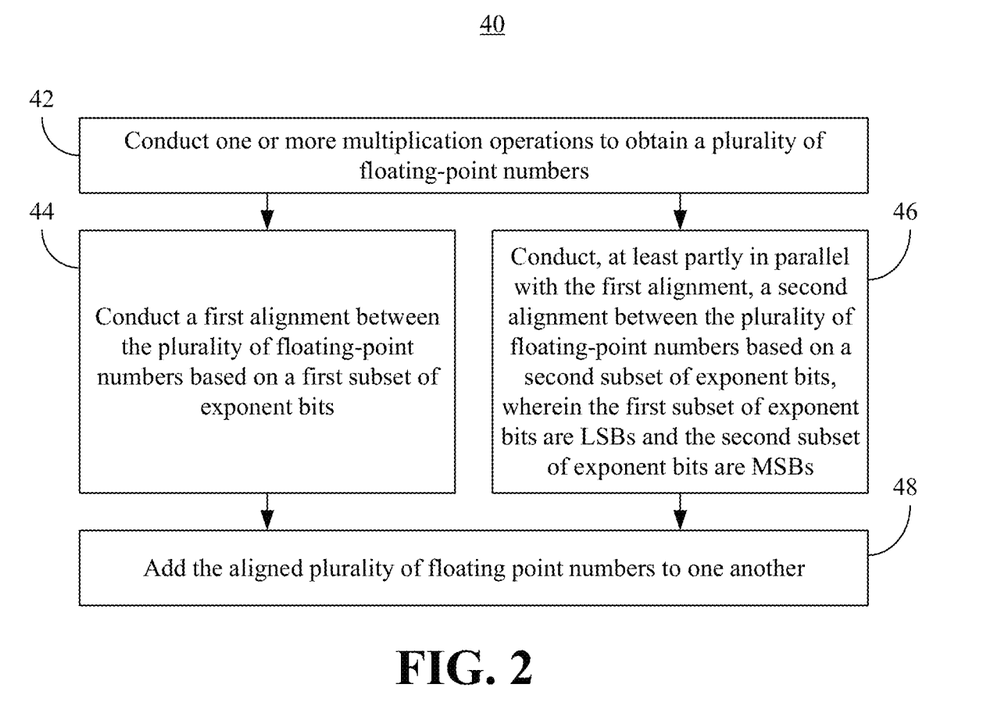
FIG. 2 is a flowchart of an example of a method of operating a multiplier-adder tree according to an embodiment.

FIG. 2 shows a method 40 of operating a multiplier-adder tree. The method 40 may generally implemented in a multiplier-adder tree topology such as, for example, the enhanced topology 28 (FIG. 1). More particularly, the method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for conducting one or more multiplication operations to obtain a plurality of floating-point numbers (e.g., having different exponents). In an embodiment, block 44 conducts a first alignment between the plurality of floating-point numbers based on a first subset of exponent bits. The first alignment may be conducted based on individual exponents relative to a predetermined constant (e.g., the maximum value that a particular subset of LSBs could have—thus, for 2 bits it could be 11, for 3 bits 111, for 4 bits 1111, etc.). Illustrated block 46 conducts, at least partially in parallel with the first alignment, a second alignment between the plurality of floating-point numbers based on a second subset of exponent bits, where the first subset of exponent bits are least significant bits (LSBs) and the second subset of exponent bits are most significant bits (MSBs). For example, the second alignment may include three operations (i) maximum exponent determination, (ii) subtraction to find shift amount, and (iii) conducting a shift operation. In one example, the first alignment occurs in parallel with operations (i) and (ii) of the second alignment. In an embodiment, the second alignment is conducted based on individual exponents relative to a maximum component across all exponents. The aligned plurality of floating-point numbers may be added to one another at block 48.

One local alignment, without losing any accuracy compared to the conventional design, involves a few extra bits $(2^s-1)$. The parameter s provides an inherent trade-off of lower alignment latency versus slightly wider adder tree bit-width. For a small s, higher adder tree bit-width is compensated by a reduced flop count at the same throughput.

Figure 3:
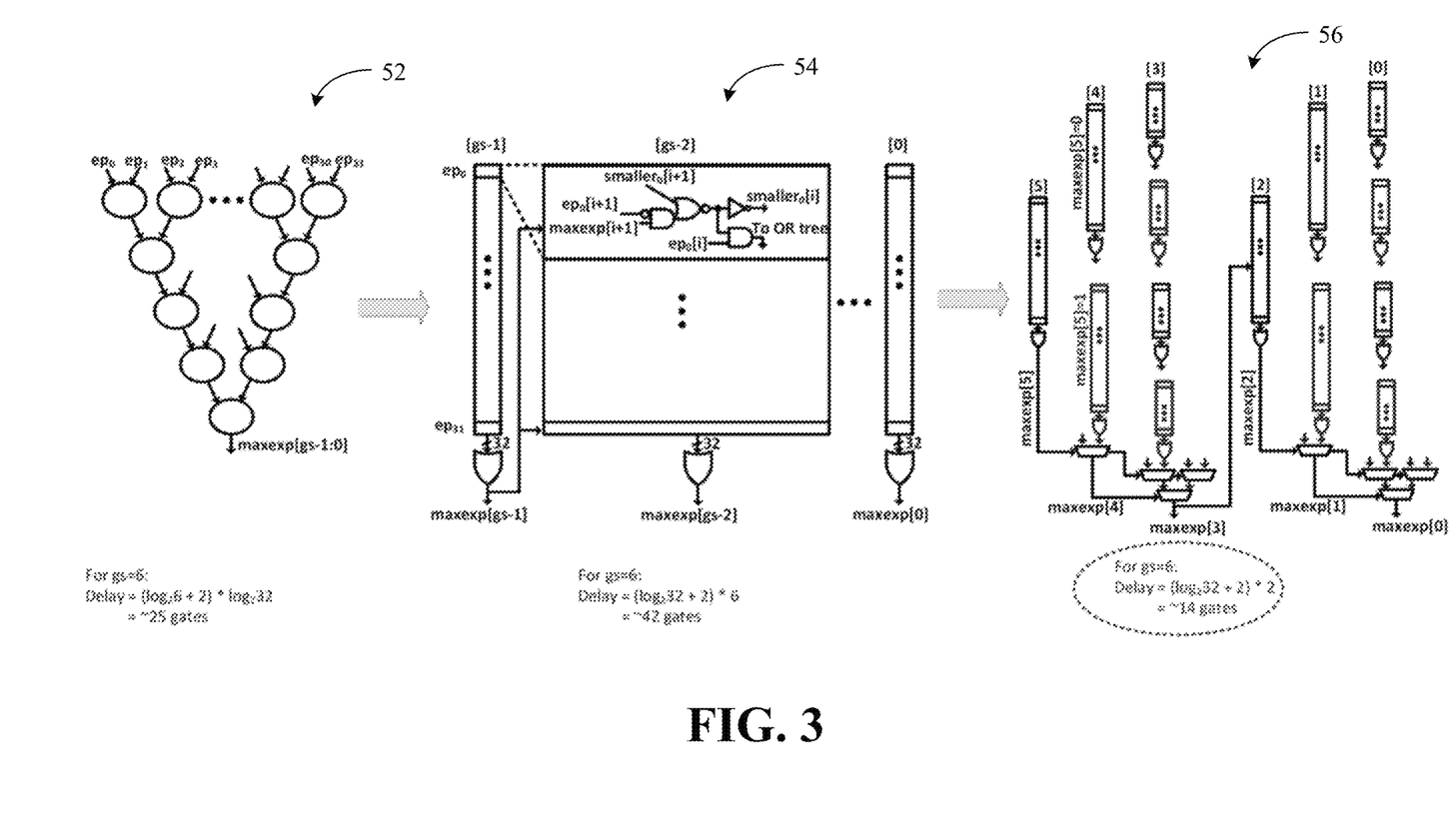
FIG. 3 is a comparative block diagram of an example of maximum exponent computation hardware according to an embodiment.

Turning now to FIG. 3, conventional logic 52 to compute maximum exponents uses a mux-based tree, with exponent comparisons and selection of the larger exponent being conducted at each node. Lowering the bit-width with decoupled global and local alignment reduces this cost. First enhanced logic 54, which may be readily substituted for the maximum exponent stage 30 (FIG. 1), demonstrates that maximum exponent computation can also be conducted in a bit-wise serial manner from MSB to LSB using OR-trees. If the OR-tree determines a "1" in the MSB position of any exponent, the maximum is guaranteed to have a "1" at the MSB as well. If any exponent has a "1" at a bit position, exponents with "0" at that same position are removed (e.g., by masking) from OR-tree computations at lower bits. These bit-wise computations proceed serially from MSB to LSB to compute the maximum exponent.

The serial dependence, however, of OR-tree inputs at lower bit positions on OR-tree outputs from higher bit-positions may limit the benefits of the first enhanced logic 54. For example, the conventional OR-tree based design may actually have higher latency than the conventional logic 52 (e.g., mux-based design) for 6-bit exponent inputs. In second enhanced logic 56, which may be readily substituted for the maximum exponent stage 30 (FIG. 1), this latency is significantly decreased with speculation to minimize dependence on upper bit OR computations. At lower bits, multiple OR-trees are used to speculatively compute results based on all possible outcomes of OR-tree computations from upper bits. Once the higher bit computations are completed, a single-gate mux delay is incurred to select the correct result at each lower bit. In an embodiment, this technique reduces latency by computing all OR-trees for different bit positions in parallel, while increasing area and energy with speculative hardware. In the second enhanced logic 56, an exponential increase in speculative OR-trees is limited with a single-point of serialization in the middle. Such an approach provides a balanced trade-off of lower latency with a minimal area overhead compared to the conventional designs. Any area overheads of the maximum exponent unit may be easily absorbed by exploiting the reduced overall latency for area reduction in the much larger FP multipliers, alignment shifters, adder-tree, and sequential components.

Figure 4:
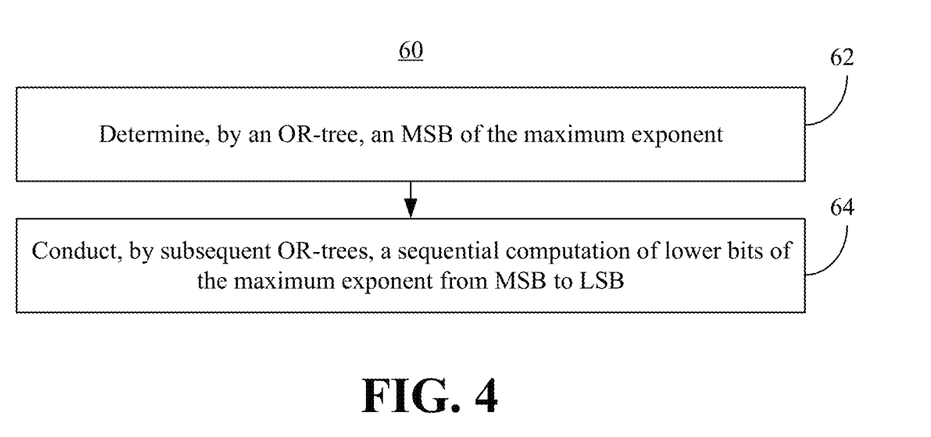
FIG. 4 is a flowchart of an example of a method of determining maximum exponent bits according to an embodiment.

FIG. 4 shows a method 60 of determining maximum exponent bits. The method 60 may generally be conducted by the maximum exponent stage 30 (FIG. 1), the first enhanced logic 54 (FIG. 3) and/or the second enhanced logic 56 (FIG. 3), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 determines, by an OR-tree, an MSB of a maximum exponent. Additionally, block 64 may provide for conducting, by subsequent OR-trees, a sequential computation of lower bits of the maximum exponent from MSB to LSB. In an embodiment, the sequential computation is conducted based on exponent bits and OR-tree results from higher significant bits. Moreover, the OR-tree computations may speculate on higher significance bit OR-tree results.

Figure 5:
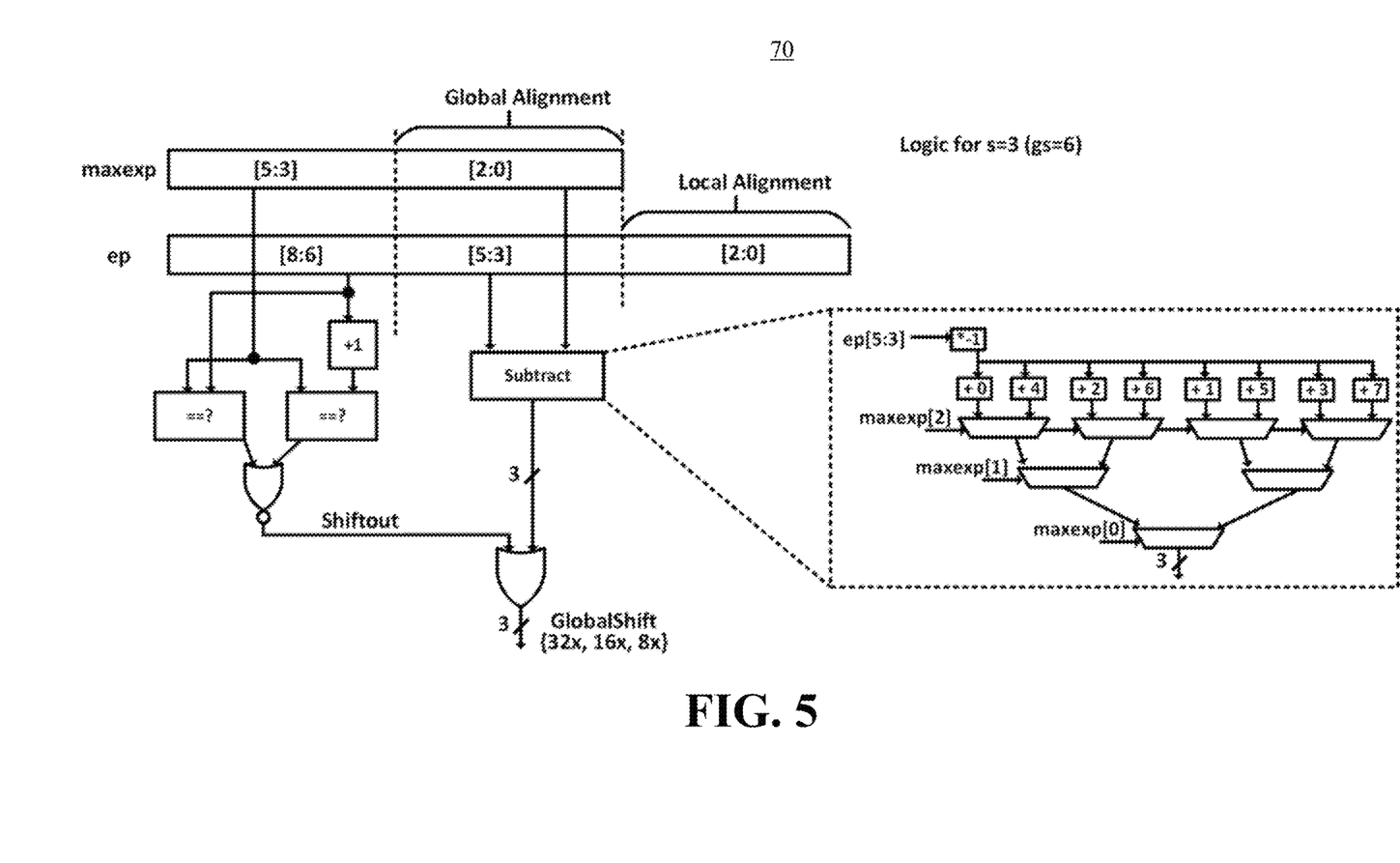
FIG. 5 is a block diagram of an example of global alignment subtraction hardware according to an embodiment.
Figure 6:
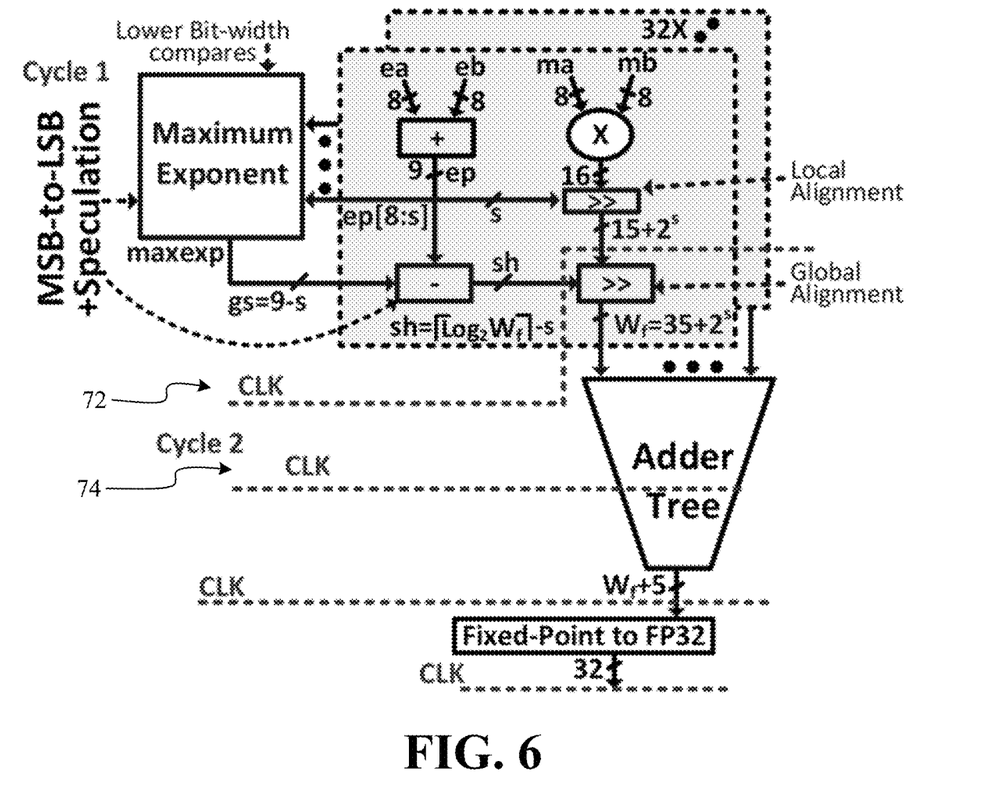
FIG. 6 is a block diagram of an example of a multiplier-adder tree hardware topology according to an embodiment.

Turning now to FIGS. 6 and 7, global alignment subtraction hardware 70 (FIG. 5) takes advantage of the MSB to LSB timing profile of the maximum exponent to compute the global alignment ("GlobalShift"). By contrast, in conventional designs, all bits of the maximum exponent might be broadcasted simultaneously, with alignment computations using conventional subtract circuits (e.g., LSB to MSB) to compute individual product alignments. The reduced latency provided by a MSB-to-LSB speculative OR-tree for maximum exponent computation enables the alignment computation to be moved from a second clock cycle 74 (FIG. 6) into an earlier first clock cycle 72 (FIG. 6). Any latency reduction after the first clock cycle 72 (FIG. 6) enables the sequential components within the adder tree to be moved downstream or removed for significant reduction in the number of flip-flops. A control signal ("Shiftout", FIG. 5) is computed early and indicates that the result needs to be completely shifted to the right and out of the fixed-point representation. Moving the alignment computation into the first clock cycle 72 also has the added benefit of enabling data-dependent clock-gating of flip-flops between the cycles 72, 74. Thus, flip-flops whose values will be right-shifted out of the fixed-point window do not need to be clocked.

Figure 7:
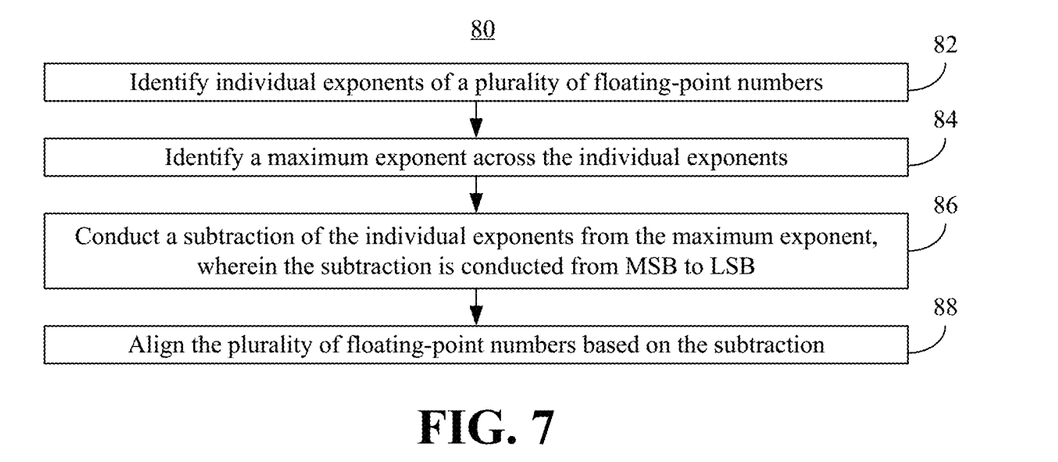
FIG. 7 is a flowchart of an example of a method of conducting a global alignment according to an embodiment.

FIG. 7 shows a method 80 of conducting a global alignment. At least a portion of the method 80 may generally be implemented in the global alignment subtraction hardware 70 (FIG. 5), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 82 identifies individual exponents of a plurality of floating-point numbers. Additionally, a maximum exponent may be identified across the individual exponents at block 84. Block 86 conducts a subtraction of the individual exponents from the maximum exponent, where the subtraction is conducted from MSB to LSB. In an embodiment, block 86 includes speculatively determining a subtraction value between possible maximum exponent values. Moreover, block 86 may include selecting a final subtraction value as maximum exponent bits are computed from MSB to LSB. Illustrated block 88 aligns the plurality of floating-point numbers based on the subtraction.

Figure 8:
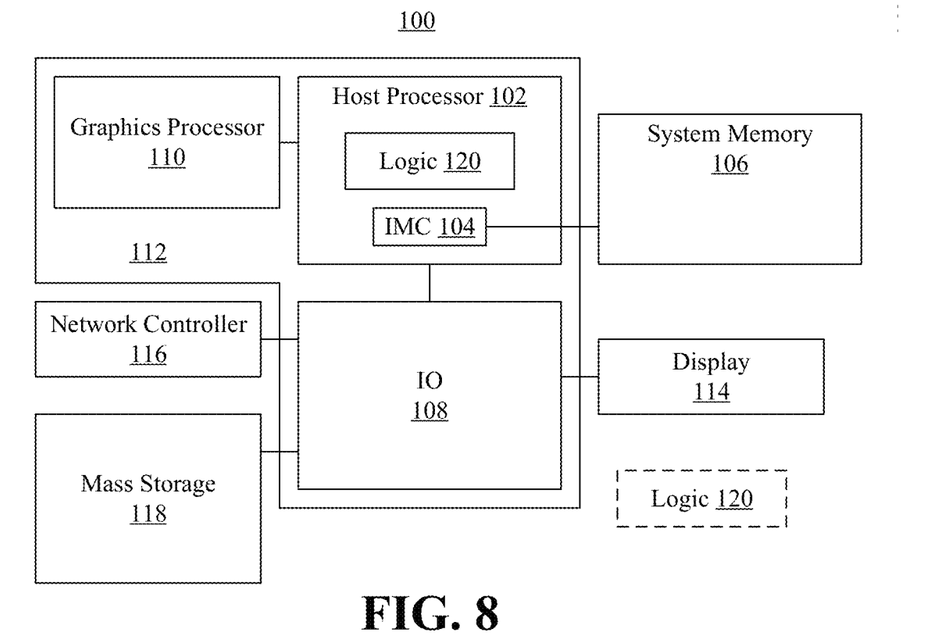
FIG. 8 is a block diagram of an example of a performance-enhanced computing system according to an embodiment.

Turning now to FIG. 8, a performance-enhanced computing system 100 is shown. The computing system 100 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), gaming functionality (e.g., networked multi-player console), etc., or any combination thereof. In the illustrated example, the system 100 includes a host processor 102 (e.g., central processing unit/CPU) having an integrated memory controller (IMC) 104 that is coupled to a system memory 106.

The illustrated system 100 also includes an input output (10) module 108 implemented together with the host processor 102 and a graphics processor 110 on a semiconductor die 112 as a system on chip (SoC). The illustrated 10 module 108 communicates with, for example, a display 114 (e.g., touch screen, liquid crystal display/LCD, light emitting diode/LED display), a network controller 116 (e.g., wired and/or wireless), and mass storage 118 (e.g., hard disk drive/HDD, optical disk, solid state drive/SSD, flash memory). In an embodiment, the host processor 102 includes logic 120 to perform one or more aspects of the method 40 (FIG. 2), the method 60 (FIG. 4) and/or the method 80 (FIG. 7), already discussed. Moreover, the logic 120 may include the enhanced topology (FIG. 1), the first enhanced logic 54 (FIG. 3), the second enhanced logic 56 (FIG. 3), the global alignment subtraction hardware 70 (FIG. 5) and/or the enhanced topology of FIG. 6.

Thus, the logic 120 may conduct a first alignment between a plurality of floating-point numbers based on a first subset of exponent bits. The logic 120 may also conduct, at least partially in parallel with the first alignment, a second alignment between the plurality of floating-point numbers based on a second subset of exponent bits, where the first subset of exponent bits are LSBs and the second subset of exponent bits are MSBs. In an embodiment, the logic 120 adds the aligned plurality of floating-point numbers to one another. Moreover, the logic 120 may identify individual exponents of a plurality of floating-point numbers, identify a maximum exponent across the individual exponents, and conduct a subtraction of the individual exponents from the maximum exponent, where the subtraction is conducted from MSB to LSB. The illustrated computing system 100 is considered performance-enhanced to the extent that the logic 120 represents an improvement over conventional topologies in terms of latency, cost and/or power consumption. Although the logic 120 is shown in the host processor 102, the logic 120 may reside elsewhere in the system 100.

Figure 9:
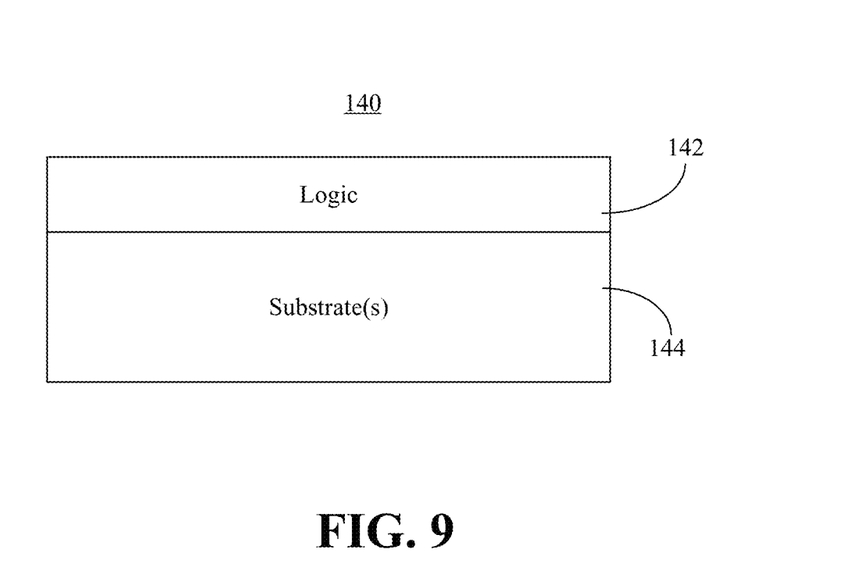
FIG. 9 is an illustration of an example of a semiconductor apparatus according to an embodiment.

FIG. 9 shows a semiconductor package apparatus 140. The illustrated apparatus 140 includes one or more substrates 144 (e.g., silicon, sapphire, gallium arsenide) and logic 142 (e.g., transistor array and other integrated circuit/IC components) coupled to the substrate(s) 144. The logic 142 may be implemented at least partly in configurable logic or fixed-functionality logic hardware. In one example, the logic 142 implements one or more aspects of the method 40 (FIG. 2), the method 60 (FIG. 4) and/or the method 80 (FIG. 7), already discussed. Moreover, the logic 142 may include the enhanced topology (FIG. 1), the first enhanced logic 54 (FIG. 3), the second enhanced logic 56 (FIG. 3), the global alignment subtraction hardware 70 (FIG. 5) and/or the enhanced topology of FIG. 6.

Thus, the logic 142 may conduct a first alignment between a plurality of floating-point numbers based on a first subset of exponent bits. The logic 142 may also conduct, at least partially in parallel with the first alignment, a second alignment between the plurality of floating-point numbers based on a second subset of exponent bits, where the first subset of exponent bits are LSBs and the second subset of exponent bits are MSBs. In an embodiment, the logic 142 adds the aligned plurality of floating-point numbers to one another. Moreover, the logic 142 may identify individual exponents of a plurality of floating-point numbers, identify a maximum exponent across the individual exponents, and conduct a subtraction of the individual exponents from the maximum exponent, where the subtraction is conducted from MSB to LSB.

In one example, the logic 142 includes transistor channel regions that are positioned (e.g., embedded) within the substrate(s) 144. Thus, the interface between the logic 142 and the substrate(s) 144 may not be an abrupt junction. The logic 142 may also be considered to include an epitaxial layer that is grown on an initial wafer of the substrate(s) 144.

Additional Notes and Examples

Example 1 includes a performance-enhanced computing system comprising a network controller and a processor coupled to the network controller, the processor including logic coupled to one or more substrates to conduct a first alignment between a plurality of floating-point numbers based on a first subset of exponent bits, conduct, at least partially in parallel with the first alignment, a second alignment between the plurality of floating-point numbers based on a second subset of exponent bits, wherein the first subset of exponent bits are least significant bits (LSBs) and the second subset of exponent bits are most significant bits (MSBs), and add the aligned plurality of floating-point numbers to one another.

Example 2 includes the computing system of Example 1, wherein the first alignment is conducted based on individual exponents relative to a predetermined constant.

Example 3 includes the computing system of Example 1, wherein the second alignment is conducted based on individual exponents relative to a maximum exponent across all exponents.

Example 4 includes the computing system of Example 3, wherein the logic coupled to the one or more substrates is to determine, by an OR-tree, an MSB of the maximum exponent, and conduct, by subsequent OR-trees, a sequential computation of lower bits of the maximum exponent from MSB to LSB.

Example 5 includes the computing system of Example 4, wherein the sequential computation is conducted based on exponent bits and OR-tree results from higher significance bits.

Example 6 includes the computing system of Example 4, wherein OR-tree computations speculate on higher significance bit OR-tree results.

Example 7 includes the computing system of any one of Examples 1 to 6, wherein the logic coupled to the one or more substrates is to conduct one or more multiplication operations to obtain the plurality of floating-point numbers.

Example 8 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to conduct a first alignment between a plurality of floating-point numbers based on a first subset of exponent bits, conduct, at least partially in parallel with the first alignment, a second alignment between the plurality of floating-point numbers based on a second subset of exponent bits, wherein the first subset of exponent bits are least significant bits (LSBs) and the second subset of exponent bits are most significant bits (MSBs), and add the aligned plurality of floating-point numbers to one another.

Example 9 includes the semiconductor apparatus of Example 8, wherein the first alignment is conducted based on individual exponents relative to a predetermined constant.

Example 10 includes the semiconductor apparatus of Example 8, wherein the second alignment is conducted based on individual exponents relative to a maximum exponent across all exponents.

Example 11 includes the semiconductor apparatus of Example 10, wherein the logic coupled to the one or more substrates is to determine, by an OR-tree, an MSB of the maximum exponent, and conduct, by subsequent OR-trees, a sequential computation of lower bits of the maximum exponent from MSB to LSB.

Example 12 includes the semiconductor apparatus of Example 11, wherein the sequential computation is conducted based on exponent bits and OR-tree results from higher significance bits.

Example 13 includes the semiconductor apparatus of Example 11, wherein OR-tree computations speculate on higher significance bit OR-tree results.

Example 14 includes the semiconductor apparatus of any one of Examples 8 to 13, wherein the logic coupled to the one or more substrates is to conduct one or more multiplication operations to obtain the plurality of floating-point numbers.

Example 15 includes a computing system comprising a network controller, and a processor coupled to the network controller, the processor including logic coupled to one or more substrates to identify individual exponents of a plurality of floating-point numbers, identify a maximum exponent across the individual exponents, and conduct a subtraction of the individual exponents from the maximum exponent, wherein the subtraction is conducted from most significant bit (MSB) to least significant bit (LSB).

Example 16 includes the computing system of Example 15, wherein to conduct the subtraction, the logic coupled to the one or more substrates is to speculatively determine a subtraction value between possible maximum exponent values and the individual exponents.

Example 17 includes the computing system of Example 16, wherein to conduct the subtraction, the logic coupled to the one or more substrates is to select a final subtraction value as maximum exponent bits are computed from MSB to LSB.

Example 18 includes the computing system of any one of Examples 15 to 17, wherein the logic coupled to the one or more substrates is to align the plurality of floating-point numbers based on the subtraction.

Example 19 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to identify individual exponents of a plurality of floating-point numbers, identify a maximum exponent across the individual exponents, and conduct a subtraction of the individual exponents from the maximum exponent, wherein the subtraction is conducted from most significant bit (MSB) to least significant bit (LSB).

Example 20 includes the semiconductor apparatus of Example 19, wherein to conduct the subtraction, the logic coupled to the one or more substrates is to speculatively determine a subtraction value between possible maximum exponent values and the individual exponents.

Example 21 includes the semiconductor apparatus of Example 20, wherein to conduct the subtraction, the logic coupled to the one or more substrates is to select a final subtraction value as maximum exponent bits are computed from MSB to LSB.

Example 22 includes the semiconductor apparatus of any one of Examples 19 to 21, wherein the logic coupled to the one or more substrates is to align the plurality of floating-point numbers based on the subtraction.

Thus, technology described herein may provide reduced latency benefits that translate to reduced area and energy at the same throughput for machine learning accelerators. For example, for a 32-element Bfloat16 multiply-adder tree, a total area reduction of up to 6% may be experienced and total energy reduction of up to 17% may be achieved.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller; and
   a processor coupled to the network controller, the processor including logic coupled to one or more substrates to:
   conduct a first alignment between a plurality of floating-point numbers based on a first subset of exponent bits;
   conduct, at least partially in parallel with the first alignment, a second alignment between the plurality of floating-point numbers based on a second subset of exponent bits, wherein the first subset of exponent bits are least significant bits (LSBs) and the second subset of exponent bits are most significant bits (MSBs), wherein the second alignment is conducted based on individual exponents relative to a maximum exponent across all exponents;
   conduct, by OR-trees, a sequential computation of lower bits of the maximum exponent from MSB to LSB, wherein OR-tree computations speculate on higher significance bit OR-tree results; and
   add the aligned plurality of floating-point numbers to one another.

2. The computing system of claim 1, wherein the first alignment is conducted based on individual exponents relative to a predetermined constant.

3. The computing system of claim 1, wherein the logic coupled to the one or more substrates is to:
   determine, by an OR-tree, the MSB of the maximum exponent, wherein the OR-trees that conduct the sequential computation are subsequent OR-trees.

4. The computing system of claim 3, wherein the sequential computation is conducted based on exponent bits and OR-tree results from higher significance bits.

5. The computing system of claim 1, wherein the logic coupled to the one or more substrates is to conduct one or more multiplication operations to obtain the plurality of floating-point numbers.

6. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   conduct a first alignment between a plurality of floating-point numbers based on a first subset of exponent bits;
   conduct, at least partially in parallel with the first alignment, a second alignment between the plurality of floating-point numbers based on a second subset of exponent bits, wherein the first subset of exponent bits are least significant bits (LSBs) and the second subset of exponent bits are most significant bits (MSBs), wherein the second alignment is conducted based on individual exponents relative to a maximum exponent across all exponents;
   conduct, by OR-trees, a sequential computation of lower bits of the maximum exponent from MSB to LSB, wherein OR-tree computations speculate on higher significance bit OR-tree results; and
   add the aligned plurality of floating-point numbers to one another.

7. The semiconductor apparatus of claim 6, wherein the first alignment is conducted based on individual exponents relative to a predetermined constant.

8. The semiconductor apparatus of claim 7, wherein the logic coupled to the one or more substrates is to:
   determine, by an OR-tree, an MSB of the maximum exponent, wherein the OR-trees that conduct the sequential computation are subsequent OR-trees.

9. The semiconductor apparatus of claim 8, wherein the sequential computation is conducted based on exponent bits and OR-tree results from higher significance bits.

10. The semiconductor apparatus of claim 6, wherein the logic coupled to the one or more substrates is to conduct one or more multiplication operations to obtain the plurality of floating-point numbers.

\* \* \* \* \*